(12) United States Patent
Schafer et al.

(10) Patent No.: US 10,738,884 B2
(45) Date of Patent: Aug. 11, 2020

(54) HYDRAULIC SWITCHING ASSEMBLY FOR A MOTOR VEHICLE

(71) Applicant: Schaeffler Technologies AG & Co. KG, Herzogenaurach (DE)

(72) Inventors: Max Schafer, Nuremberg (DE); Wolfgang Christgen, Seukendorf (DE); Volker Schmidt, Burgbernheim (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 100 days.

(21) Appl. No.: 16/064,696

(22) PCT Filed: Jan. 18, 2017

(86) PCT No.: PCT/DE2017/100025
§ 371 (c)(1),
(2) Date: Jun. 21, 2018

(87) PCT Pub. No.: WO2017/125108
PCT Pub. Date: Jul. 27, 2017

(65) Prior Publication Data
US 2019/0003587 A1    Jan. 3, 2019

(30) Foreign Application Priority Data

Jan. 19, 2016   (DE) .................. 10 2016 200 626

(51) Int. Cl.
*F16H 61/30*   (2006.01)
*F16H 1/06*    (2006.01)
(Continued)

(52) U.S. Cl.
CPC ............. *F16H 61/30* (2013.01); *F15B 1/024* (2013.01); *F15B 21/041* (2013.01);
(Continued)

(58) Field of Classification Search
CPC .......... F15B 1/024; F15B 1/26; F15B 21/041; F16H 61/40; F16H 61/50; F16H 61/4043;
(Continued)

(56) References Cited

U.S. PATENT DOCUMENTS 8,739,953 B2    6/2014  Gassmann et al.
9,200,705 B2 *  12/2015 Garabello ............... F16H 57/02
(Continued)

FOREIGN PATENT DOCUMENTS

CN    102808731    12/2012
CN    202832962    3/2013
(Continued)

*Primary Examiner* — Michael Leslie
*Assistant Examiner* — Daniel S Collins
(74) *Attorney, Agent, or Firm* — Volpe and Koenig, P.C.

(57) ABSTRACT

A hydraulic switching assembly for a motor vehicle, having a hydraulic pump (1) which guides a hydraulic medium from a reservoir (2) via hydraulic lines (3) and at least one magnetic valve assembly (4) including a magnetically actuatable switching valve (5), to a switching element (6) in order to hydraulically actuate the switching element (6) between two switching positions. A pressure accumulator (7) and a first check valve (8a) are mounted in a supply line (3a) upstream of the switching valve (5) in order to realize a reliable temporary supply of oil pressure to the switching element (6).

18 Claims, 3 Drawing Sheets

(51) Int. Cl.
*F16H 61/06* (2006.01)
*F15B 1/02* (2006.01)
*F15B 21/041* (2019.01)
*F15B 21/042* (2019.01)

(52) U.S. Cl.
CPC ......... *F15B 21/042* (2013.01); *F16H 61/067* (2013.01); *F15B 2211/212* (2013.01); *F15B 2211/30505* (2013.01); *F15B 2211/30525* (2013.01); *F15B 2211/40507* (2013.01); *F15B 2211/41563* (2013.01); *F15B 2211/50545* (2013.01); *F15B 2211/5156* (2013.01); *F15B 2211/7052* (2013.01); *F16H 2061/305* (2013.01)

(58) Field of Classification Search
CPC ............. F16H 61/4052; F16H 61/4096; F16H 61/4165
USPC .......................................................... 60/413
See application file for complete search history.

(56) References Cited

U.S. PATENT DOCUMENTS

| | | | |
|---|---|---|---|
| 2003/0047410 A1* | 3/2003 | Busold | .................... F16D 25/14 |
| | | | 192/103 F |
| 2013/0319806 A1* | 12/2013 | Schindler | ............ F16H 63/3483 |
| | | | 188/353 |
| 2015/0082784 A1 | 3/2015 | Uenishi | |

FOREIGN PATENT DOCUMENTS

| | | |
|---|---|---|
| CN | 203130673 | 8/2013 |
| CN | 103539019 | 1/2014 |
| DE | 10052666 | 5/2002 |
| DE | 102005046630 | 4/2007 |
| DE | 102008046350 | 3/2010 |
| DE | 102009005410 | 4/2012 |
| EP | 2381137 | 10/2011 |
| JP | 2010255584 | 11/2010 |

* cited by examiner

HYDRAULIC SWITCHING ASSEMBLY FOR A MOTOR VEHICLE

BACKGROUND

The invention relates to a hydraulic switching assembly for a motor vehicle, comprising a hydraulic pump that feeds a hydraulic medium from a sump via hydraulic lines and at least via a magnetic valve assembly with a magnetically actuatable switching valve to a switching element, in order to hydraulically actuate the switching element between two switching positions.

In particular, the invention extends to a hydraulic switching assembly in motor applications of motor vehicles, wherein motor oil from an oil sump of the motor is provided as the hydraulic medium.

In general, switching valves are known that are used for controlling two-stage switchable motor elements. Here, an existing oil pressure in the motor oil circuit is used to actuate the locking mechanism of the switchable motor elements preferably by a 3/2-way directional control switching valve. The directional control switching valve is controlled corresponding to an engine characteristic map stored in the engine control module as a function of various parameters, such as engine speed, engine load, vehicle speed, operating temperature, etc. As a rule, the switching valve is mounted directly in the cylinder head and integrated in the oil circuit, wherein the switching valve includes an electromagnet and a hydraulic part. When the switching valve is energized, oil flows from the oil pump to the switchable motor elements and switches the locking mechanisms of the switchable motor elements. When the switching valve is not energized, the passage from the oil pump to the switching elements is closed and the oil flows via a bypass through the switching gallery with low pressure back to the oil pan, wherein the locking mechanisms are switched back into their original position. The switching times depend on the mechanics of the switching valve and on the design of the hydraulic circuit.

A disadvantage is that, when the engine is at a standstill, the oil pressure in the motor circuit decreases, so that the switchable motor elements are no longer controllable. Furthermore, the system has a high sensitivity with respect to oil pressure fluctuations.

SUMMARY

The object of the present invention is to refine a hydraulic switching assembly of the previously mentioned type and, in particular, to avoid the previously mentioned disadvantages.

According to the invention, a pressure accumulator and a first check valve are arranged in a feed line upstream of the switching valve, in order to realize a reliable temporary supply of oil pressure to the switching element. In other words, the pressure accumulator is located with the hydraulic pressure medium during a closed switching position of the switching valve. An opening of the switching valve causes a loading of the switching element with hydraulic pressure medium from the pressure accumulator due to the check valve. Consequently, the switching element can be actuated independent of the operation of the hydraulic pump, in particular, when the engine of the motor vehicle is at a standstill. Furthermore, pressure fluctuations in the hydraulic lines have no influence on the actuation of the switching element. The pressure accumulator achieves the highest efficiency when it is arranged in the direct vicinity of the switching valve. Furthermore, the switching valve can be reset both by the hydraulic pressure and also by springs.

Preferably, the pressure accumulator and the first check valve are integrated in the magnetic valve assembly. Thus, the magnetic valve assembly is provided, in particular, for retrofitting on a switching assembly.

According to a respective preferred embodiment, the pressure accumulator is constructed as a membrane accumulator, gas accumulator, or piston accumulator. Preferably, the pressure accumulator has either a pneumatic spring or a mechanical spring.

The invention includes the technical teaching that a throttle valve is arranged in a bypass line upstream of the first check valve, in order to realize a flushing of the hydraulic lines via a run-back line of the switching valve leading to the sump. In particular, the switching gallery is flushed in reverse via the throttle valve.

Preferably, a second check valve is arranged downstream of the throttle valve. The check valve prevents a flow of hydraulic medium when the switching valve is open.

Preferably, the bypass line is integrated in the magnetic valve assembly. In particular, the bypass line establishes either a direct fluid connection to the run-back line or an indirect fluid connection via the switching valve.

In addition, a first pressure limiting valve is preferably arranged in the run-back line of the switching valve, in order to set a pressure when flushing the hydraulic lines. Furthermore, a second pressure limiting valve is preferably arranged in a pressure-relief line leading to the sump downstream of the hydraulic pump. A pressure increase above a predetermined pressure level thus opens the respective pressure limiting valve and enables a flow of the hydraulic medium back into the sump.

In particular, a filter device for cleaning the oil is provided downstream of the hydraulic pump. According to an advantageous embodiment, a cooling device for cooling the oil is provided downstream of the hydraulic pump.

BRIEF DESCRIPTION OF THE DRAWINGS

Additional measures relating to the invention are described in more detail below together with the description of three preferred embodiments of the invention with reference to the figures. Shown are.

DETAILED DESCRIPTION

Figure 1:
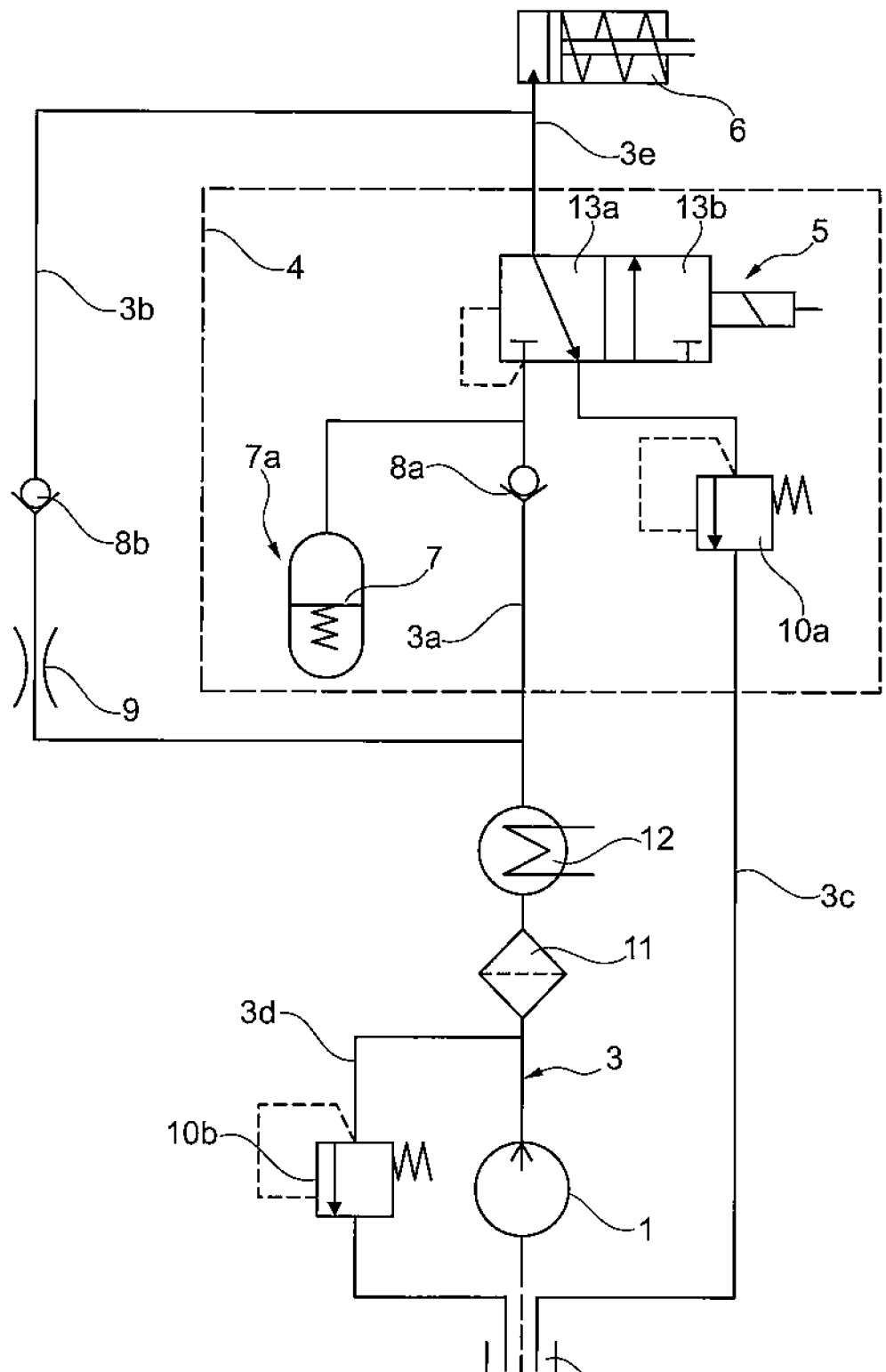
FIG. 1 a schematic view for illustrating the setup of the hydraulic switching assembly according to the invention according to a first embodiment, FIG. 2 a schematic view for illustrating the setup of the hydraulic switching assembly according to the invention according to a second embodiment, FIG. 3 a schematic view for illustrating the setup of the hydraulic switching assembly according to the invention according to a third embodiment.
Figure 2:
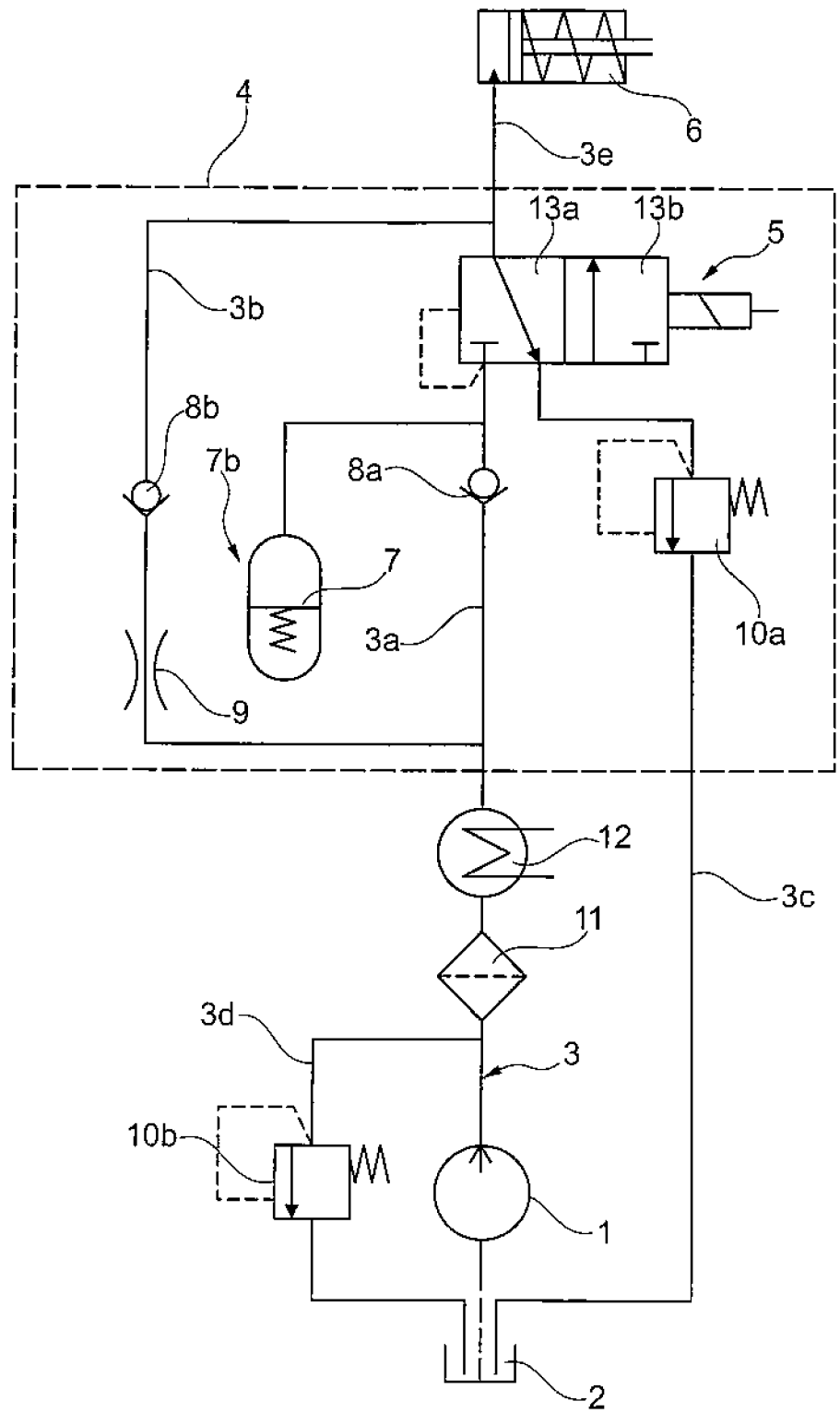
Figure 3:
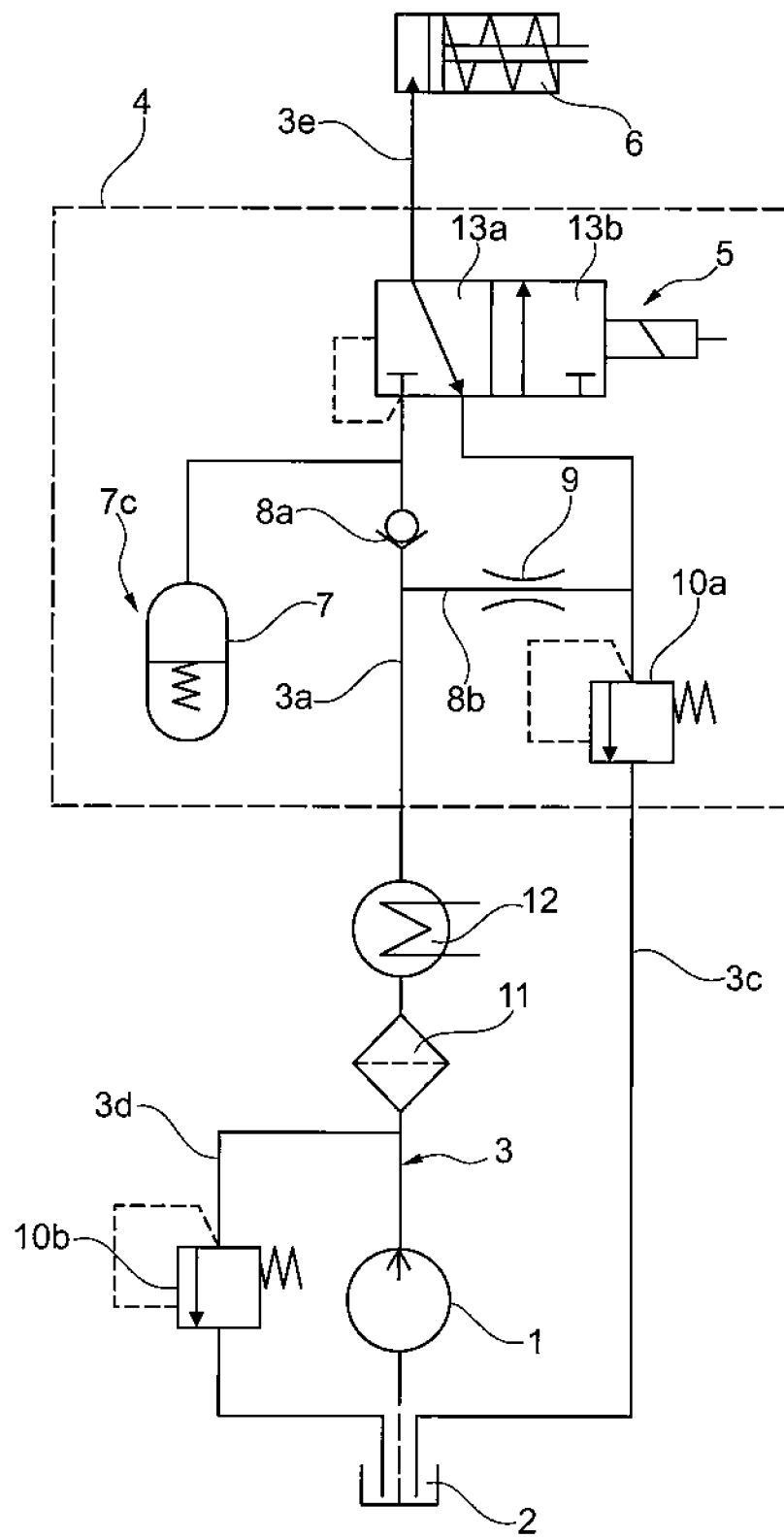

According to FIGS. 1, 2, and 3, a hydraulic switching assembly according to the invention for a motor vehicle—not shown here—has a hydraulic pump 1 that feeds a hydraulic medium from a sump 2 via hydraulic lines 3. In particular, the hydraulic medium is motor oil of the motor vehicle. The motor oil is fed via the hydraulic pump 1 through a filter device 11 for cleaning the motor oil and through a cooling device 12 for cooling the motor oil to a magnetic valve assembly 4. A pressuring limiting valve 10b is arranged in a pressure-relief line 3d leading to the sump 2 downstream of the hydraulic pump 1 and upstream of the filter device 11. When a preset oil pressure in the line section between the pump 1 and the filter device 11 is exceeded, the pressure limiting valve 10b opens and enables the return of motor oil into the sump 2 via the pressure-relief line 3d.

The magnetic valve assembly 4 has a magnetically actuatable switching valve 5 that is constructed as a 3/2-way directional control switching valve. A first check valve 8a is arranged in a feed line 3a of the switching valve 5. A pressure accumulator 7 is arranged between the first check valve 8a and the switching valve 5. The pressure accumulator 7 is connected with a fluid connection to the switching valve 5 via the feed line 3a of the switching valve 5. Furthermore, the pressure accumulator 7 and the first check valve 8a are integrated in the magnetic valve assembly 4. The switching valve 5 is connected to the switching element 6 via a work line 3e, in order to hydraulically actuate the switching element 6 between two switching positions.

The switching valve 5 has a first and second switching position 13a, 13b, wherein, in the first switching position 13a of the switching valve 5, a flow of the motor oil to the switching element 6 is blocked and thus the switching element 6 is not hydraulically actuated. For a magnetic actuation of the switching valve 5, a fluid connection between the pressure accumulator 7 and the switching element 6 is established by the switching valve 5, in order to realize a reliable temporary supply of oil pressure to the switching element 6 and to hydraulically actuate the switching element 6.

According to FIG. 1, the pressure accumulator 7 is constructed as a membrane accumulator 7a. A throttle valve 9 is arranged in a bypass line 3b upstream of the first check valve 8a, in order to realize a flushing of the hydraulic lines 3 by the use of a run-back line 3c of the switching valve 5 leading to the sump 2. A pressure limiting valve 10a is arranged in the run-back line 3c of the switching valve 5, in order to set a pressure during flushing of the hydraulic lines 3. The flushing of the hydraulic lines 3 and especially also the flushing of the switching gallery are performed in the illustrated first switching position 13a of the switching valve 5. Furthermore, a second check valve 8b is arranged in the bypass line 3b downstream of the throttle valve 9. The second check valve 8b is provided to prevent leakage via the throttle valve 9 during the actuation of the switching element 6 by the switching valve 5 located in the second switching position 13b.

According to FIG. 2, the pressure accumulator 7 is constructed as a gas accumulator 7b. In contrast to the embodiment from FIG. 1, the bypass line 3b is integrated in the magnetic valve assembly 4 in the embodiment according to FIG. 2. Thus, the throttle valve 9 and the second check valve 8b are also located in the magnetic valve assembly 4. The pressure limiting valve 10a arranged in the run-back line 3c sets the hydraulic pressure for flushing of the hydraulic lines 3.

According to FIG. 3, the pressure accumulator 7 is constructed as a piston accumulator 7c. The bypass line 3b is connected directly to the run-back line 3c leading to the sump 2 in contrast to the respective bypass line 3b according to the first and second embodiment. A throttle valve 9 for flushing the hydraulic lines 3 is arranged in the bypass line 3b. The pressure for flushing the hydraulic lines 3 is set by the first pressure limiting valve 10a in the run-back line 3c.

List of Reference Symbols

1 Pump
2 Sump
3 Lines
3a Feed line
3b Bypass line
3c Run-back line
3d Pressure-relief line
3e Work line
4 Magnetic valve assembly
5 Switching valve
6 Switching element
7 Pressure accumulator
7a Membrane accumulator
7b Gas accumulator
7c Piston accumulator
8a, 8b Check valve
9 Throttle valve
10a, 10b Pressure limiting valve
11 Filter device
12 Cooling device
13a, 13b Switching position

The invention claimed is:

1. A hydraulic switching assembly for a motor vehicle, the hydraulic switching assembly comprising:
   a hydraulic pump that is adapted to feed a hydraulic medium from a sump via hydraulic lines;
   a magnetic valve assembly with a magnetically actuatable switching valve by which the hydraulic medium is adapted to be fed via the hydraulic lines to a switching element in order to hydraulically actuate the switching element between two switching positions;
   a pressure accumulator and a first check valve arranged in a feed line upstream of the switching valve that are adapted to provide a temporary supply of oil pressure to the switching element; and
   a throttle valve arranged in a bypass line upstream of the first check valve that allows a flushing of the hydraulic lines via a run-back line of the switching valve that leads to the sump.

2. The switching assembly according to claim 1, wherein the pressure accumulator and the first check valve are integrated in the magnetic valve assembly.

3. The switching assembly according to claim 1, wherein the pressure accumulator is constructed as a membrane accumulator, gas accumulator, or piston accumulator.

4. The switching assembly according to claim 1, further comprising a second check valve arranged in the bypass line downstream of the throttle valve.

5. The switching assembly according to claim 4, wherein the bypass line is integrated in the magnetic valve assembly.

6. The switching assembly according to claim 1, further comprising a first pressure limiting valve arranged in the run-back line of the switching valve that sets a pressure for the flushing of the hydraulic lines.

7. The switching assembly according to claim 1, further comprising a second pressure limiting valve arranged in a pressure-relief line that leads to the sump downstream of the hydraulic pump.

8. The switching assembly according to claim 1, further comprising a filter device that cleans the hydraulic medium located downstream of the hydraulic pump.

9. The switching assembly according to claim 1, further comprising a cooling device that cools the hydraulic medium located downstream of the hydraulic pump.

10. A hydraulic switching assembly, comprising:
    a magnetic valve assembly with a magnetically actuatable switching valve;
    a hydraulic pump that is adapted to feed a hydraulic medium from a sump via hydraulic lines and the magnetic valve assembly to a switching element in order to hydraulically actuate the switching element between two switching positions;

a first check valve arranged in a feed line upstream of the switching valve;

a pressure accumulator arranged in the feed line downstream of the check valve and upstream of the switching valve that supplies a temporary supply of oil pressure to the switching element; and a throttle valve arranged in a bypass line upstream of the first check valve that allows a flushing of the hydraulic lines via a run-back line of the switching valve that leads to the sump.

11. The switching assembly according to claim 10, wherein the pressure accumulator and the first check valve are integrated in the magnetic valve assembly.

12. The switching assembly according to claim 10, wherein the pressure accumulator is constructed as a membrane accumulator, gas accumulator, or piston accumulator.

13. The switching assembly according to claim 10, further comprising a second check valve arranged in the bypass line downstream of the throttle valve.

14. The switching assembly according to claim 13, wherein the bypass line is integrated in the magnetic valve assembly.

15. The switching assembly according to claim 10, further comprising a first pressure limiting valve arranged in the run-back line of the switching valve that sets a pressure for the flushing of the hydraulic lines.

16. The switching assembly according to claim 10, further comprising a second pressure limiting valve arranged in a pressure-relief line that leads to the sump downstream of the hydraulic pump.

17. The switching assembly according to claim 10, further comprising a filter that cleans the hydraulic medium located downstream of the hydraulic pump.

18. The switching assembly according to claim 10, further comprising a cooling device that cools the hydraulic medium located downstream of the hydraulic pump.

* * * * *